United States Patent Office 3,387,032
Patented June 4, 1968

3,387,032
PROCESS FOR THE MANUFACTURE OF METHYLAMINES
Jackson D. Leonard, 437 5th Ave., New York, N.Y. 10016
No Drawing. Filed June 8, 1965, Ser. No. 462,399
5 Claims. (Cl. 260—585)

ABSTRACT OF THE DISCLOSURE

A process for the manufacture of methylamines by reacting ammonia with a compound selected from the group consisting of methanol, dimethyl ether and mixtures thereof wherein a catalyst is used which consists of a silica gel base carrying alumina which had partially been steam-deactivated at pressures of 1 to 50 atmospheres and then impregnated with 0.05 to 0.95 weight percent silver phosphate, rhenium heptasulfide, molybdenum- or cobalt sulfide. This catalyst promotes the formation of dimethylamine in preference to mono- and trimethylamines.

---

This invention relates to the process for the production of amines by the reaction of an alcohol or ether with ammonia in the vapor phase in the presence of a catalyst and, more particularly, to novel catalysts used in the production of methyl amines from ammonia and methyl alcohol or dimethyl ether, or mixtures of methyl alcohol and dimethyl ether.

The catalytic synthesis of amines from alcohols has been described in the literature. Prior art catalysts have consisted of various dehydrating oxides, such as thoria, alumina, zirconia, silica, tungsten, or copper oxides, deposited on various carriers such as carbon, kieselguhr, silica gel or other carrier; or dehydrating salts such as aluminum phosphate, mixed alkali aluminum silicates, or mixtures of these dehydrating salts with dehydrating oxides, fixed on inert carriers such as granulated pumice, carbon, kieselguhr, diatomaceous earth, quartz, graphite, asbestos, slag, sand and so forth, or alone. Catalysts of this kind have been disclosed, e.g., in U.S. Patents 1,992,935 _____ Mar. 5, 1935
2,017,051 _____ Oct. 15, 1935
2,017,069 _____ Oct. 15, 1935
2,073,671 _____ Mar. 16, 1937
2,113,241 _____ Apr. 5, 1938

The reaction forming methylamines is carried out by vaporizing an excess of ammonia with methanol or dimethyl ether or mixtures thereof, and passing the mixture of vapors through suitable preheaters to bring it up to reaction temperature, and then passing these hot vapors through a bed of the catalyst in a suitable reactor at temperatures ranging from 200° C. to 500° C. and at pressures ranging from atmospheric to 500 p.s.i.g., but preferably from 350° to 450° and 150 to 300 p.s.i.g. pressure.

Using any of these prior art catalysts under the conditions specified, typical feed composition and product compositions from the reactor with various catalysts are tabulated below:

| Constituent | Feed, Wt. Percent | Prior Art Catalyst #1 Product, Wt. Percent | Prior Art Catalyst #2 Product, Wt. Percent |
|---|---|---|---|
| Ammonia | 64.0 | 52.9 | 54.0 |
| Methanol (or Dimethyl Ether) | 36.0 | 0 | 0.8 |
| Monomethylamine |  | 6.9 | 7.6 |
| Dimethylamine |  | 9.4 | 8.0 |
| Trimethylamine |  | 10.2 | 9.6 |
| Water |  | 20.2 | 19.8 |
| Organics [1] |  | 0.2 | 0.1 |
| CO, H$_2$ |  | 0.2 | 0.1 |
| Total | 100.0 | 100.0 | 100.0 |

[1] Formaldehyde, etc.

It will be noted that neither type of prior art catalyst yield dimethylamine, the most desired product, as the predominant product, but instead, in order to obtain complete conversion of the methanol, the reaction was driven predominantly to produce trimethylamine, the least wanted of the three amine products.

In actual commercial practice, the unwanted amine product is recycled to the reactor in order to suppress formation of that product in the reaction so that, using prior art catalysts under these conditions, typical results as tabulated below are obtained:

| Constituent | Feed, Wt. Percent | Prior Art Catalyst #1 Product, Wt. Percent | Prior Art Catalyst #2 Product, Wt. Percent |
|---|---|---|---|
| Ammonia | 50.0 | 46.8 | 47.1 |
| Methanol (or Dimethyl Ester) | 20.0 | 0 | 0.6 |
| Monomethylamine | 10.0 | 6.5 | 7.1 |
| Dimethylamine | 0 | 11.3 | 10.0 |
| Trimethylamine | 20.0 | 23.9 | 24.0 |
| Water | 0 | 11.0 | 10.9 |
| Organics [1] | 0 | 0.2 | 0.1 |
| CO, H$_2$ | 0 | 0.3 | 0.2 |
| Total | 100.0 | 100.0 | 100.0 |

[1] Formaldehyde, etc.

It will again be noted that both types of prior art catalyst yield trimethylamine as the predominant product which has to be separated and recycled to the reactor, and this involves added processing costs and handling losses.

The object of this invention is to provide improved catalysts for the catalytic synthesis of the methylamines which will produce increased quantities of dimethylamine, the most wanted product, and less trimethylamine but, at the same time, give complete conversion of the methanol or dimethyl ether, and little or no by-product formation.

These new catalysts consists of a silica gel base impregnated with 10–15% alumina in the form of aluminum oxide which catalyst has been steam deactivated to reduce the activity in order to minimize by-product formation, and the catalyst then is uniformly treated with 0.05 to 0.95% silver phosphate, rhenium heptasulfide, molybdenum or cobalt sulfide to promote selectivity and yield of dimethylamine.

In the following examples, I have set forth examples of embodiments of my invention, but they are presented only for purposes of illustration and not as a limitation of the invention, as hereinafter claimed.

Example 1

A commercial grade silica-alumina gel is prepared in the conventional manner by reaction of carbon dioxide and sodium silicate to form a silica hydrogel followed by impregnation with aluminum sulfate and precipitation with ammonia, followed by washing of the precipitated gel to rid it of soluble salts, and then dried at sufficiently high temperature to form solid, almost moisture-free silica-alumina oxide solids. The amount of aluminum sulfate used in the coprecipitation step is adjusted to give an average of 12–13% aluminum oxide in the finished dry solids. These dry solids are then charged into an autoclave and partially deactivated with high pressure steam under pressures ranging from 1 to 30 atmospheres for a period of time sufficient to reduce the total surface of the material to 90±20 square meters per gram (m.$^2$/g.), to reduce the pore volume to 0.34±0.10 cm.$^3$/gram and increase the pore diameter to 145±20 angstroms. Without this steam deactivation, the catalyst has a total surface of about 500±30 m.$^2$/g., pore volume of 0.60±cm.$^3$/gram and pore diameter of 74±10 angstroms. The deactivated solids are next charged to a mixer where an ammoniacal solution of silver phosphate, Ag$_3$(PO$_4$), is sprayed on to the solids to give a uniform saturation of the solid catalyst with the solution. The solution strength is adjusted so that, after drying, the dried material will contain from 0.05 to 0.15% Ag$_3$(PO$_4$). The saturated solid is then dried, and pelleted into 3/16″ cylindrical pellets.

When this catalyst is placed in a suitable reactor at temperatures ranging from 300° to 450° C. and at pressures ranging from atmospheric to 300 p.s.i.g., and fed with a mixture of preheated ammonia and methanol or dimethyl ether vapors, typical results are tabulated below along with typical results obtained with prior art catalysts:

| Constituent | Feed, Wt. percent | Prior Art Catalyst #1 | Prior Art Catalyst #2 | Catalyst This Invention |
|---|---|---|---|---|
| Ammonia | 64.0 | 52.9 | 54.0 | 53.4 |
| Methanol (or Di methyl ether) | 36.0 | 0 | 0.8 | 0 |
| Monomethylamine | | 6.9 | 7.6 | 7.0 |
| Dimethylamine | | 9.4 | 8.0 | 13.7 |
| Trimethylamine | | 10.2 | 9.6 | 5.4 |
| Water | | 20.2 | 19.8 | 20.2 |
| Organics [1] | | 0.2 | 0.1 | 0 |
| CO, H$_2$ | | 0.2 | 0.1 | 0.3 |
| Total | 100.0 | 100.0 | 100.0 | 100.0 |

[1] Formaldehyde, etc.

In actual commercial operation, where any unwanted amine product is recycled to the reactor in order to suppress formation of that product in the reaction, typical results obtained using the catalyst of this invention are tabulated below along with typical results obtained with prior art catalysts:

| Constituent | Feed, Wt. percent | Prior Art Catalyst #1 | Prior Art Catalyst #2 | Catalyst This Invention |
|---|---|---|---|---|
| Ammonia | 50.0 | 46.8 | 47.1 | 44.0 |
| Methanol (or Dimethyl Ether) | 20.0 | 0 | 0.6 | 0 |
| Monomethylamine | 8.0 | 6.5 | 7.1 | 11.3 |
| Dimethylamine | 2.0 | 11.3 | 10.0 | 21.9 |
| Trimethylamine | 20.0 | 23.9 | 24.0 | 11.7 |
| Water | 0 | 11.0 | 10.9 | 10.9 |
| Organics [1] | 0 | 0.2 | 0.1 | 0 |
| CO, H$_2$ | 0 | 0.3 | 0.2 | 0.2 |
| Total | 100.0 | 100.0 | 100.0 | 100.0 |

[1] Formaldehyde, etc.

Example 2

A commercial grade silica-alumina gel was prepared exactly as described in Example #1 including steam deactivation of the solid gel. However, after steam deactivation, these solids were charged to a mixer where they were sprayed with a solution of rhenium heptasulfide to give a uniform saturation of the solid catalyst with the solution. The solution strength is adjusted so that, after drying, the dried material will contain from 0.05 to 0.25% Re$_2$S$_7$. The saturated solid is then dried and pelleted into 3/16″ cylindrical pellets.

When this catalyst is placed in a suitable reactor at temperatures ranging from 300° to 450° C. and at pressures ranging from atmospheric to 300 p.s.i.g. and fed with a preheated mixture of ammonia and methanol or dimethyl ether vapors, typical results are tabulated below along with typical results obtained with prior art catalyst:

| Constituent | Feed, Wt. percent | Prior Art Catalyst #1 | Prior Art Catalyst #2 | Catalyst This Invention |
|---|---|---|---|---|
| Ammonia | 64.0 | 52.9 | 54.0 | 53.2 |
| Methanol (or Di methyl ether) | 36.0 | 0 | 0.8 | 0 |
| Monomethylamine | | 6.9 | 7.6 | 7.1 |
| Dimethylamine | | 9.4 | 8.0 | 13.8 |
| Trimethylamine | | 10.2 | 9.6 | 5.3 |
| Water | | 20.2 | 19.8 | 20.3 |
| Organics [1] | | 0.2 | 0.1 | 0 |
| O, H$_2$ | | 0.2 | 0.1 | 0.3 |
| Total | 100.0 | 100.0 | 100.0 | 100.0 |

[1] Formaldehyde etc.

In actual commercial operation where any unwanted amine product is recycled to the reactor in order to suppress formation of that product in the reaction, or simply to avoid taking it out of the system as product, typical results obtained using the catalyst of this invention are tabulated below along with typical results obtained with prior art catalysts:

| Constituent | Feed, Wt. percent | Prior Art Catalyst #1 | Prior Art Catalyst #2 | Catalyst This Invention |
|---|---|---|---|---|
| Ammonia | 50.0 | 46.8 | 47.1 | 44.0 |
| Methanol (or Dimethyl ether) | 20.0 | 0 | 0.6 | 0 |
| Monomethylamine | 8.0 | 6.5 | 7.1 | 12.3 |
| Dimethylamine | 2.0 | 11.3 | 10.0 | 22.9 |
| Trimethylamine | 20.0 | 23.9 | 24.0 | 9.7 |
| Water | 0 | 11.0 | 10.9 | 10.9 |
| Organics [1] | 0 | 0.2 | 0.1 | 0 |
| CO, $H_2$ | 0 | 0.3 | 0.2 | 0.2 |
| Total | 100.0 | 100.0 | 100.0 | 100.0 |

[1] Formaldehyde etc.

Example 3

A commercial grade silica-alumina gel was prepared exactly as described in Example #1 including steam deactivation of the solid gel. However, after steam deactivation, these solids were charged to a mixer where they were sprayed with a solution of molybdenum sulfide to give a uniform saturation of the solid catalyst with the solution. The solution strength is adjusted so that after drying, the dried material will contain from 0.1 to 0.4% $MoS_3$. The saturated solid is then dried and pelleted into 1/16, 3/16 or 1/4″ cylindrical pellets or spheres.

Another catalyst was prepared starting with the silica-alumina gel described in Example #1, but after steam deactivation, the solids were charged to a mixer and sprayed with a solution of cobaltic sulfide dissolved in sulfuric acid. The solution strength is adjusted so that, after drying, the dried material will contain from 0.05 to 0.5% $Co_2S_3$. The saturated solid is dried and pelleted into convenient sized cylinders or spheres ranging in size from 1/16 to 1/4″.

When either of the above catalysts is placed in a suitable reactor at temperatures ranging from 300° to 450° C. and at pressures ranging from atmospheric to 300 p.s.i.g. or higher and fed with a preheated mixture of ammonia and methanol or dimethyl ether vapors, typical results are tabulated below with results obtained with a prior art catalyst:

| Constituent | Feed, Weight Percent | Prior Art Catalyst #1 | $MoS_3$ Catalyst This Invention | $Co_2S_3$ Catalyst This Invention |
|---|---|---|---|---|
| Ammonia | 50.0 | 46.8 | 44.0 | 44.0 |
| Methanol (or Dimethyl ether) | 20.0 | 0 | 0 | 0 |
| Monomethylamine | 8.0 | 6.5 | 15.0 | 11.8 |
| Dimethylamine | 1.0 | 11.3 | 18.5 | 23.8 |
| Trimethylamine | 20.0 | 23.9 | 10.5 | 9.0 |
| Water | 0 | 11.0 | 11.8 | 11.2 |
| Organics [1] | 0 | 0.2 | 0 | 0 |
| CO, $H_2$ | 0 | 0.3 | 0.2 | 0.2 |
| Total | 100.0 | 100.0 | 100.0 | 100.0 |

[1] Formaldehyde etc.

It will be noted that the catalysts which are the subject of this invention give a greatly increased quantity of dimethylamine, less trimethylamine, and no organic by-products, which, from a commercial standpoint, is highly desirable.

It should be understood that the method described in this example for the preparation of the catalyst may be varied in many ways to achieve a finished catalyst with the characteristics described, especially to those skilled in catalyst manufacture, but variations in the method of catalyst preparation are not intended to limit my invention.

A small quantity of each of the new catalysts described herein was placed in a separate container in a commercial reactor, and after one year of service under normal, commercial operating conditions, the catalysts was tested and found to have the same activity and selectivity as originally charged, while prior art catalyst in the reactor for the same period of time, was tested and found to have activity reduced by about 15%–20%. It was concluded that the new catalyst described herein would have a longer life cycle than prior art catalysts.

I claim as my invention:

1. In the process of producing methylamines by reacting ammonia with a compound consisting of methanol, dimethyl ether and mixtures thereof, the improvement which comprises carrying out said reaction in the vapor phase and in the presence of a silica-alumina pellet which had been partially deactivated by exposure to steam at 1 to 50 atmospheres pressure and which thereafter had been uniformly impregnated with 0.05 to 0.95 percent by weight of a salt selected from the group consisting of silver phosphate, rhenium heptasulfide, molybdenum sulfide and cobalt sulfide.

2. In the process of producing methylamines by reacting ammonia with a compound selected from the group consisting of methanol, dimethyl ether and mixtures thereof at pressures ranging from atmospheric to 500 p.s.i.g. and at temperatures from 200 to 500° C., the improvement which comprises carrying out said reaction in the presence of a catalyst consisting of a silica gel base carrying 10–15 percent by weight alumina in the form of aluminum oxide, said catalyst having been partially deactivated with steam at pressures ranging from 1 to 50 atmospheres and thereafter uniformly impregnated with 0.05 to 0.95 percent by weight of a salt selected from the group consisting of silver phosphate, rhenium heptasulfide, molybdenum sulfide and cobalt sulfide.

3. In the process of producing methylamines by the reaction of an excess of ammonia with a compound selected from the group consisting of methanol, dimethyl ether and mixtures therof, and with compounds selected from the group consisting of recycled mono-, di- and trimethylamine and mixtures thereof, in the vapor phase and in contact with a catalyst at pressures ranging from atmospheric to 500 p.s.i.g. and at temperatures from 200 to 500° C., the improvement which comprises contacting the vaporized reaction mixture with a catalyst consisting of a silica gel base carrying 10 to 15 percent by weight activated alumina and 0.05 to 0.95 percent by weight of a salt selected from the group consisting of silver phosphate, rhenium heptasulfide, molybdenum sulfide and cobalt sulfide, said catalyst having been partially deactivated with high pressure steam at pressure ranging from 1 to 50 atmospheres, prior to entering it in the reaction.

4. In the process of producing methylamines by the reaction of an excess of ammonia with a compound selected from the group consisting of methanol, dimethyl ether and mixtures thereof, and with compounds selected from the group consisting of recycled mono-, di- and trimethylamine and mixtures thereof, in the vapor phase and in contact with a catalyst at pressures ranging from atmospheric to 500 p.s.i.g. and at temperatures of 200 to 500° C., the improvement which comprises contacting the vaporized reaction mixture with a catalyst consisting of a silica gel base carrying 10 to 15 percent by weight alumina, said catalyst having been partially deactivated with high pressure steam at pressures ranging from 1 to 50 atmospheres and then impregnated uniformly with 0.05 to 0.95 percent by weight of a salt selected from the group consisting of silver phosphate, rhenium heptasulfide, molybdenum sulfide and cobalt sulfide.

5. In the process of producing methylamines by the reaction of an excess of ammonia with a compound selected from the group consisting of methanol, dimethyl ether and mixtures thereof, and with a compound selected from the group consisting of recycled mono-, di- and trimethylamine and mixtures thereof, in the vapor phase and in contact with a catalyst at pressures ranging from 150 to 300 p.s.i.g. and at temperatures of 350 to 450° C., the improvement which comprises contacting the vaporized reaction mixture with a catalyst consisting of a silica gel base carrying 10 to 15 percent by weight alumina, said catalyst having been partially deactivated with high pressure steam at pressures ranging from 1 to 50 atmospheres and then uniformly impregnated with 0.05 to 0.95 percent by weight of a salt selected from the group consisting of silver phosphate, rhenium heptasulfide, molybdenum sulfide and cobalt sulfide.

References Cited

UNITED STATES PATENTS 2,078,922   5/1937   Arnold.
2,389,500   11/1945  Goshorn.

CHARLES B. PARKER, *Primary Examiner.*

R. L. RAYMOND, *Assistant Examiner.*